US010492640B2

(12) United States Patent
Jain

(10) Patent No.: US 10,492,640 B2
(45) Date of Patent: Dec. 3, 2019

(54) SYSTEM AND METHOD FOR PRODUCING AND DISPENSING BEVERAGES

(71) Applicant: Deepak Jain, Maharashtra Mumbai (IN)

(72) Inventor: Deepak Jain, Maharashtra Mumbai (IN)

( * ) Notice: Subject to any disclaimer, the term of this patent is extended or adjusted under 35 U.S.C. 154(b) by 226 days.

(21) Appl. No.: 15/322,415

(22) PCT Filed: Apr. 28, 2015

(86) PCT No.: PCT/IB2015/053075
§ 371 (c)(1),
(2) Date: Dec. 27, 2016

(87) PCT Pub. No.: WO2015/198164
PCT Pub. Date: Dec. 30, 2015

(65) Prior Publication Data
US 2018/0116445 A1    May 3, 2018

(30) Foreign Application Priority Data

Jun. 27, 2014   (IN) .......................... 2092/MUM/2014
Jun. 27, 2014   (IN) .......................... 2093/MUM/2014

(51) Int. Cl.
*A47J 31/44* (2006.01)
*A47J 31/52* (2006.01)
(Continued)

(52) U.S. Cl.
CPC ............... *A47J 31/446* (2013.01); *A23F 3/18* (2013.01); *A47J 31/18* (2013.01); *A47J 31/46* (2013.01); *A47J 31/52* (2013.01)

(58) Field of Classification Search
CPC .......... A47J 31/446; A47J 31/18; A47J 31/46; A47J 31/52; A23F 3/18
See application file for complete search history.

(56) References Cited

U.S. PATENT DOCUMENTS 5,775,204 A * 7/1998 Link ................... A47J 31/0615
99/299
6,149,035 A   11/2000 Gorski et al.
(Continued)

FOREIGN PATENT DOCUMENTS

WO   WO-2009/120708 A1   10/2009
WO   WO-2014/015340 A2   1/2014

OTHER PUBLICATIONS

Search Report and Written Opinion for International Application No. PCT/IB2015/053075, dated Sep. 22, 2015.

*Primary Examiner* — Anthony J Weier
(74) *Attorney, Agent, or Firm* — Marshall, Gerstein & Borun LLP

(57) ABSTRACT

The system and method for producing and dispensing beverages ensures consistent delivery of the beverages by maintaining the associated natural flavours of the ingredients therein. Upon receiving a signal from an input panel co-operating with a controller, predetermined quantity of ingredients of beverage like tea leaves/tea powder, sweetener, condiments and hot/boiling water is introduced through a funnel into a brewing chamber. An agitator connected to a motor is activated to stir the ingredients of the beverage. Brewing continues in the brewing chamber for a predetermined time. When the decoction is ready for being dispensed, a conical hatch is released thereby causing the decoction to flow outside the system into a receiving means through an outlet valve that may be optionally passed through a flipping filtering mechanism.

23 Claims, 3 Drawing Sheets

(51) Int. Cl.
*A47J 31/46* (2006.01)
*A23F 3/18* (2006.01)
*A47J 31/18* (2006.01)

(56) References Cited

U.S. PATENT DOCUMENTS 6,324,964 B1 * 12/2001 Niederberger ...... A47J 31/0615
 99/287
2002/0104442 A1 * 8/2002 Maxwell ............. A47J 31/0605
 99/287

* cited by examiner

US 10,492,640 B2

SYSTEM AND METHOD FOR PRODUCING AND DISPENSING BEVERAGES

FIELD OF THE DISCLOSURE

The present disclosure relates generally to automatic viable brewing and dispensing systems for beverages, particularly brewing systems which generate high quality beverage maintaining the natural flavour of the beverage consistently.

BACKGROUND

In view of changing lifestyles, beverages have become increasingly popular with consumers in recent years. Producing a high quality beverage on a commercial scale that consistently tastes like it was brewed at home presents challenges. Currently available commercial systems and methods for supplying beverages such as tea do not produce a steadfast high quality beverage. Use of premixes of beverage often fails to render the natural flavour of the beverage because of various processes the premixes undergoes such as mixing, roasting, grinding, extracting of thick and thin ingredients, drying and the like. Unlike liquid premixes which usually retain flavourants without adverse stability problems, dry comestible beverage mixes are often lacking in flavour or have off-flavours due to poor storage stability and low shelf life. Further, brewing tea using tea bags also involves several disadvantages like the tea becomes cold before the flavor is properly infused in it, inconvenience with waste tea bags disposal and the like.

Further, there exists a limitation in the present systems and methods with respect to the disposal of residues or spent leaves of the beverages after the filtration process, which often requires manual removal of residue repeatedly which is cumbersome and time consuming. For systems that are automated for residual disposal, they are often complicated to assemble, install and function and are not highly energy efficient Considering the aforementioned disadvantages, there is a need for a system and method for producing beverages that delivers high quality beverage without compromising its natural flavor. Furthermore, such systems are required to be comprised in or attached in an automated means of residue removal after a filtration process. One of such automated means employable by a brewing system is a filtering assembly capable of rotatory flipping which is effective, simple to use and energy efficient.

SUMMARY

In accordance with the present invention, there is provided an automatically controllable system and method for producing and dispensing beverages with consistent delivery of beverages by maintaining associated natural flavours of the ingredients therein such that the beverage is freshly brewed. Upon receiving a signal from an input panel co-operating with a controller, predetermined quantity of ingredients of a beverage such as but not limited to tea/coffee, sweetener, condiments and hot/boiling water is introduced through a funnel into a brewing chamber. An agitator connected to a motor is activated to stir the ingredients of the beverage. Brewing continues in the brewing chamber for a predetermined time. When the decoction is ready for being dispensed, a hatch is released or disengaged, thereby causing the decoction to flow outside the system into a receiving means through an outlet valve.

In accordance with yet another aspect of the present invention, there is provided an automatic flipping or overturning mechanism, wherein the mechanism involves a pivoting component being operationally coupled and employed by an actuator to perform a rotating movement. A supporting component operationally coupled to the pivoting component is capable of rotating around the pivoting component on engaging the actuator.

DETAILED DESCRIPTION

The present invention in a broad aspect discloses automatically controllable systems and methods for brewing and dispensing brewed beverages essentially comprising at least a brewing chamber having an inlet for receiving the ingredients required for brewing a beverage and an outlet for dispensing the brewed beverage.

The system and method for producing and dispensing beverages in accordance with the present invention will now be described with reference to the embodiment shown in the accompanying drawings. The exemplary embodiment is explained particularly with reference to brewing tea for ease of understanding.

Figure 1:
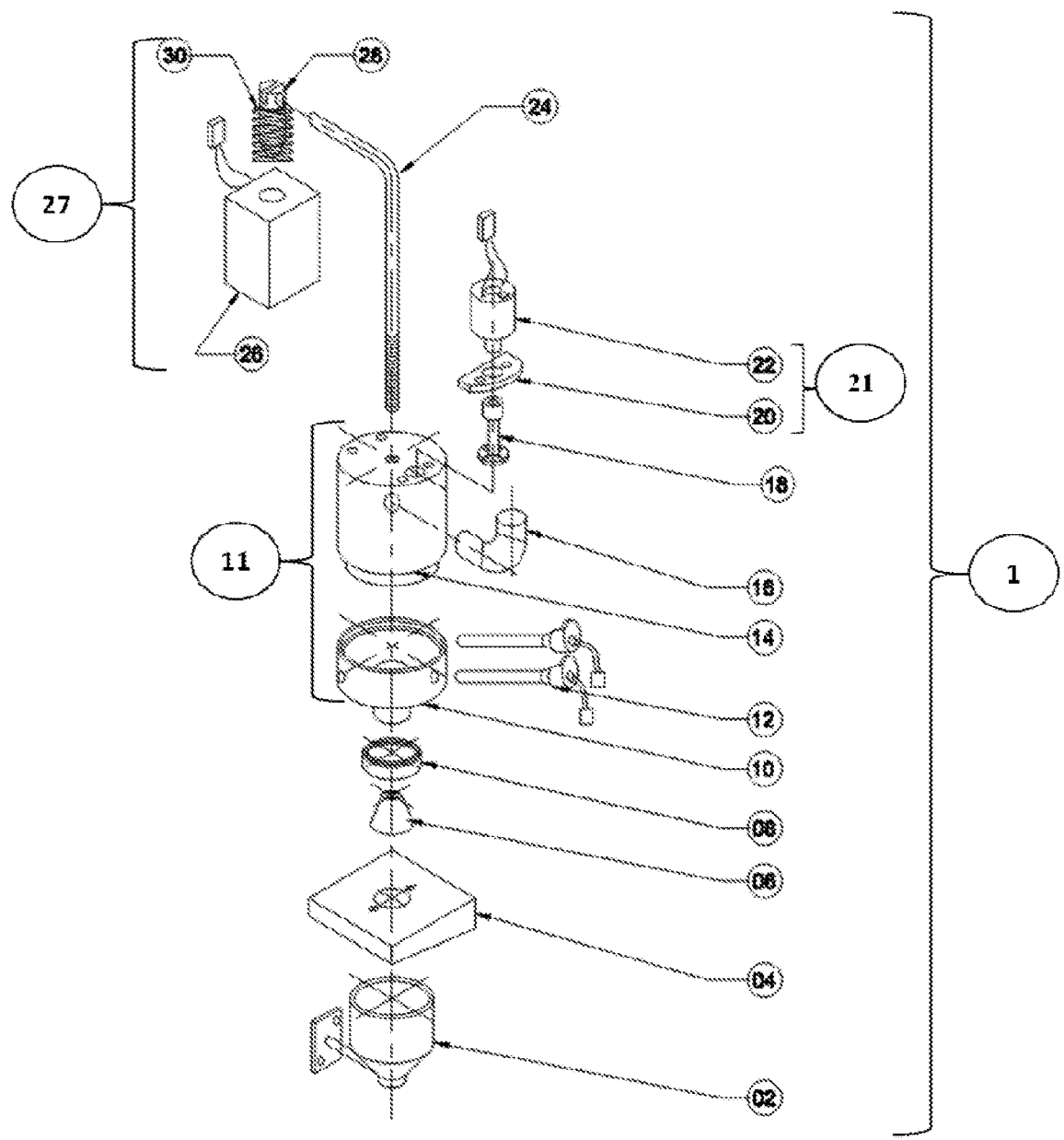
FIG. 1 is an exploded and perspective view of an exemplary brewing system for producing and dispensing beverages, in accordance with the present invention.

FIG. 1 is an exemplary exploded and perspective view of the exemplary automatically controllable brewing system for producing and dispensing tea, in accordance with one aspect of the present invention. The key elements of the system under consideration are referenced generally by reference numerals for enhancing clarity. The system 1 comprises an input panel (not particularly indicated), typically disposed on a user accessible exterior of the system, to initiate brewing. The input panel is associated with an electronic controller for performing one or more control operations related to the system 1 and signaling a user input to a triggering component. Upon receiving a signal from the input panel the triggering component triggers the feeding of ingredients in an inlet funnel, whereby the inlet funnel 16 receives ingredients of the beverage to be freshly brewed such as a predetermined quantity of a mixture of tea in the form of tea powder or tea leaves, hot water (which is capable of being introduced tangentially) at a predetermined temperature and optionally sweetener and condiments. The predetermined quantity of mixture and its introduction is typically controlled by the electronic controller based on user preferences selected on the input panel. The inlet funnel 16 guides the mixture into a brewing chamber 11 comprising an upper chamber 14 and lower chamber 10. An agitator 18 disposed within the brewing chamber 11 is activated and driven by an agitator motor 21 (the motor being particularly referenced by numeral 22 having a supporting base member 20). The agitator enables agitation of the mixture for brewing the beverage to prepare a decoction or the brewed beverage. The agitator motor 21 is disposed on the operational top of the brewing chamber 11. However, the agitator motor 21 may be placed anywhere within the system to ensure unhindered operation of the agitator 18. The temperature of the lower chamber may be controlled using temperature control components 12. Brewing of the tea continues for a predetermined time and when the process is completed, an actuator 27 (optionally an electromagnetic actuator) having a solenoid magnet 26 with a plunger 28 enabled to move within the solenoid magnet 26, the plunger 28 having a spring 30 connected therein; thereby pulling the plunger 28 causing the shaft to be pulled and setting free or disengages a conical hatch 06 co-operating with a connecting shaft 24 when the solenoid magnet is charged. The conical hatch 06 may be coupled to a bush (typically a circular bush) 08 that engages with the conical portion. The bush 08 aids in adjusting the sealing pressure of the conical hatch 06. The release of the conical hatch 06 causes the decoction or the brewed beverage to outflow into an outlet valve 02 through which the decoction or the brewed beverage is dispensed out. The outlet valve 02 is optionally disposed with a flow directing component such as fins (not particularly indicated) which controls the flow of the dispensing liquid and prevents splatter or reverse flow of the dispensed liquid. When the brewing process is completed, the agitator motor is stopped and the conical hatch is opened at the same instant to dispense the decoction, to cause the rotational momentum of the decoction enable speedy motion of exit from the chamber such that no particulate matter is allowed to settle or stick to any surface of the brewing chamber. A supporting member 04 may be used to provide support to the components of the system.

In yet another alternative arrangement the outlet valve is placed operationally such that the release of the outlet valve 02 causes the decoction to flow into a conical hatch. Although the exemplary embodiment illustrated in FIG. 1 and explained herein above employs a conical hatch 06, it may be understood by a person skilled in the art, that the hatch is not limited to a conical shape and any shape serving the purpose as described may be employed. Likewise, it may be understood that the actuator 27 may alternatively be a gear and pinion arrangement or any other arrangement, either hydraulic, pneumatic, electric or mechanical intended to perform actions as described herein above with reference to an electromagnetic actuator.

Figure 2:
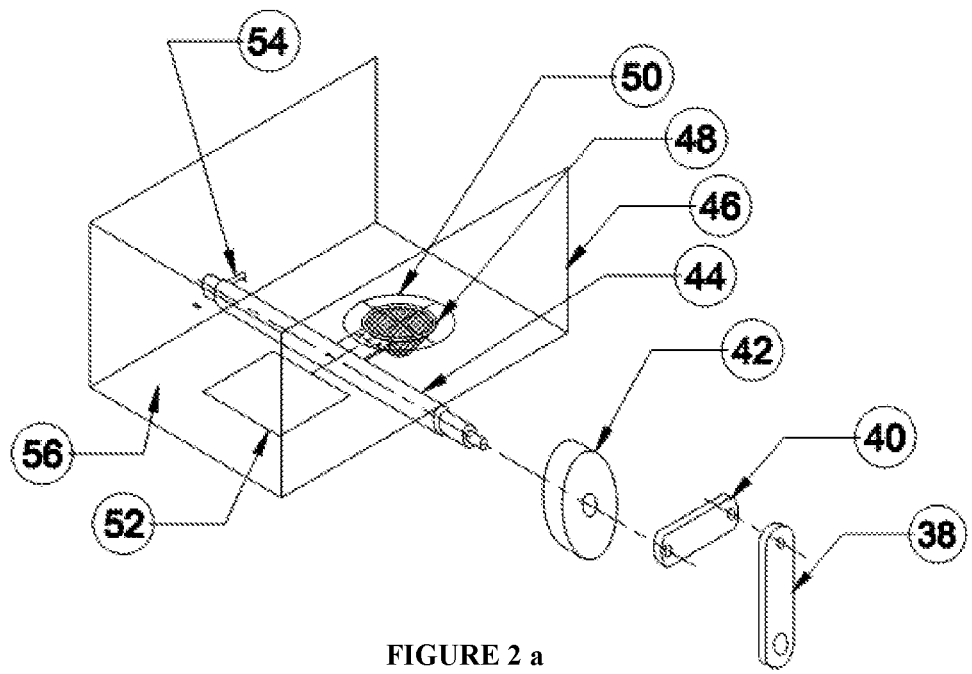
FIG. 2a is a perspective view of an exemplary flip mechanism wherein the strainer is in the resting position in accordance with the present invention.
FIG. 2b is an isometric view of an exemplary actuator which aids in flipping the strainer.
Figure 2:
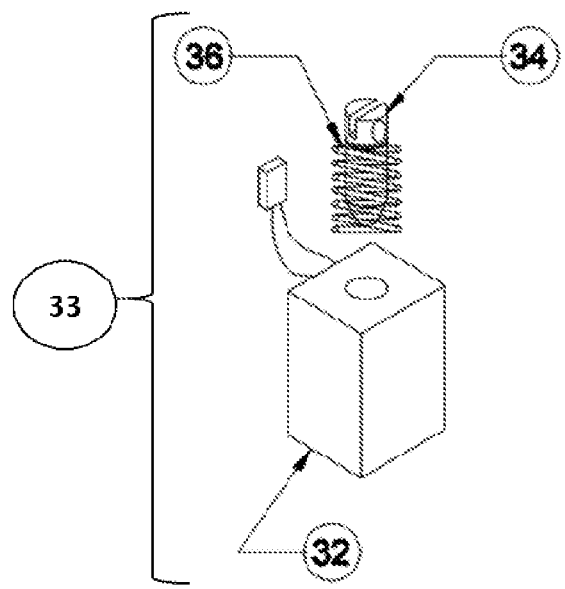

FIG. 2a is an exemplary perspective view of the filtering system as an optional part of the present invention associated with overturning or flip mechanism, comprising at least one filtering component or a strainer 48, held within at least one supporting component 50, wherein at least one pivoting component 44 is coupled to the at least one supporting component 50. The at least one supporting component 50 is capable of flipping or overturning on induction of rotational motion to the at least one pivoting component 44 by at least one flipping actuator 33 (shown in FIG. 2 b) operationally coupled to the at least one pivoting component 44. On induction, the at least one filtering component 48 is flipped or overturned equipped due to a shaft 4244 to allow flipping or overturning movements allowing residue to be discarded or removed. One or more components of the system are supported with a frame 46 with a base 56, wherein an opening 52 is provided for removal or discarding of the residue. The at least one filtering component or the strainer 48 is a detachable component which is coupled to a half milled shaft 44. One end of the shaft 44 is attached to the actuator 33. A flip clasp 54 coupled to the at least one pivoting component 44 triggers the rotational movement of the strainer 48 using active energy by about 30-45 degrees only. The remaining angular displacement of the strainer 48 is achieved by the velocity/momentum of the spin. The essential push to dislocate the spent leaves from the strainer 48 is provided by the velocity/momentum and the abrupt stop. The frame 46 with a base frame 56 may be used as a supporting component for the components of the flip mechanism and associated system.

FIG. 2b is an exemplary isometric view of an electromagnetic actuator 33 which aids in flipping the strainer 48. The electromagnetic actuator 33 co-operates with a plunger 34 which may be made up of magnetic material which in turn co-operates with a 2-armed lever arrangement. When a solenoid magnet 32 constituting the actuator 33 is charged, the plunger 34 having a spring 36 connected therein enables movement of the plunger 34 within the solenoid magnet 32 thereby clutching one arm 38 of the lever arrangement. This clutching action causes angular displacement of the second arm 40 that in turn causes the flip clasp 54 to trigger the flip motion of the strainer 48 by 30-45 degrees and then the velocity/momentum enables the remaining angular displacement of the strainer 48. When the solenoid magnet 32 of the electromagnetic actuator 33 is de-energized, the strainer 48 flips back into its resting position as shown in FIG. 2 a.

Although the exemplary flip mechanism explained herein above particularly refers to an electromagnetic actuator 33, it may be understood by a person skilled in the art that a gear and pinion arrangement or any other arrangement, either hydraulic, pneumatic, electric or mechanical, serving the purpose as described may be alternatively employed in the embodiment explained herein above.

It may also be understood that the flip clasp 54 is an optional component provided to improve the efficiency and cost effectiveness of the flip mechanism by reducing the power requirement of the actuator 32 by limiting the rotational movement caused by the actuator 32 to a portion of the required angular displacement.

Figure 3:
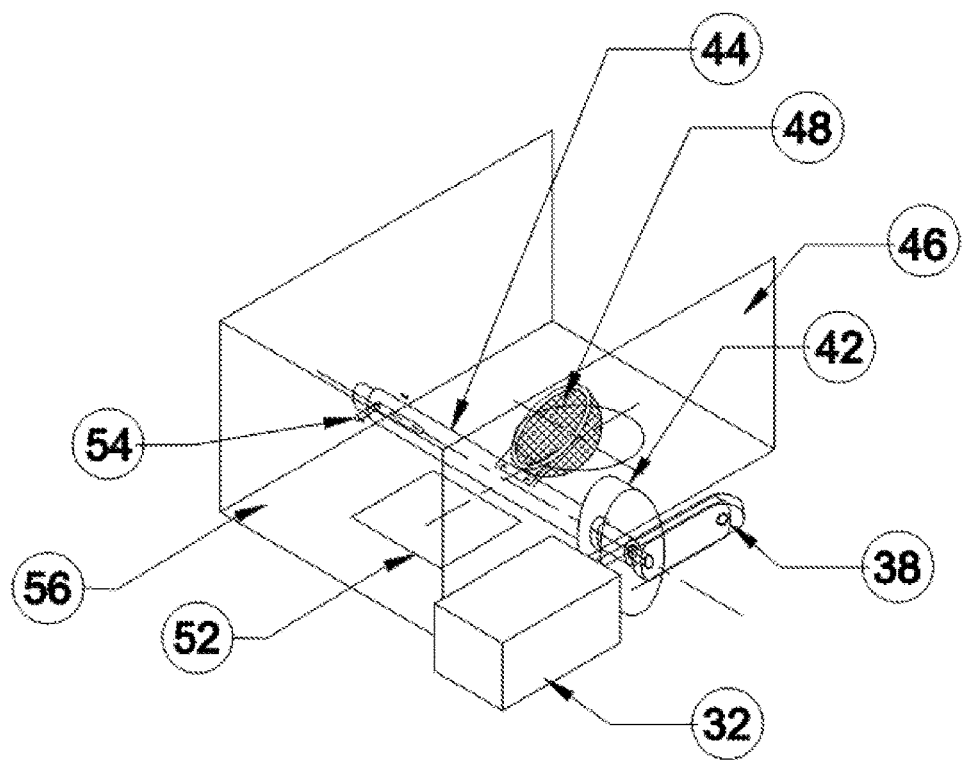
FIG. 3 is a perspective view of the flip mechanism of FIG. 2a wherein the strainer is not in the rest position but reflects a position during the course of flipping action.

FIG. 3 is an exemplary perspective view of flip mechanism and associated system wherein the strainer 48 is not in the rest position but reflects a position during the course of flipping action. When the flip clasp 54 is rotated influenced by the motion of the two armed levers of the electromagnetic actuator 33, the strainer 48 is actuated or jolted from its resting position to rotate.

Unless there is a statement in the specification specific to the contrary, any variation in the number or specification of the components comprising the system of the present invention, described in a general way to emphasize the nature of the envisaged system, is construed to be within the scope of the present invention.

In accordance with another embodiment of the system of the present invention, the agitator is disposed off-center within the brewing chamber to maximize agitation of the mixture introduced therein without crushing or chopping the tea leaves. The off-center placement of the agitator avoids formation of an intense vortex effect.

In accordance with yet another embodiment of the system of the present invention, the agitator which is driven by an agitator motor may be of any specially designed shape.

In accordance with yet another embodiment of the system of the present invention, the agitator may be driven by alternative drives including gear reducers, belts, magnetic drives and the like.

In accordance with an alternative embodiment of the system of the present invention, the brewing chamber is optionally pre-heated to a predetermined temperature to prevent heat loss or to allow a suitable temperature for the brewing.

In accordance with another embodiment of the system of the present invention, the conical hatch is substantially conical in shape and is typically positioned in an upright manner at the distal end of the shaft to operationally permit or prevent the flow of decoction from the brewing chamber.

In accordance with a further embodiment of the system of the present invention, the brewing chamber comprises of an upper chamber and a lower chamber made up of any suitable material. In an exemplary embodiment, the upper chamber may be made up of food grade plastic and the lower chamber may be made up of metals such as aluminum and may be Teflon coated. The lower chamber is without limitation typically pre-heated and thermally controlled so as to enhance and/or customize the flavor such as burnt flavor of tea, if required by the user. The introduction of the hot water may impart considerable heat to the pre-heated upper chamber, thus providing it a sustained higher temperature. The brewing chamber may be provided with two inlets. One inlet is the inlet funnel that guides the mixture of tea and optionally sweetener and condiments into the brewing chamber and the second inlet being provided for introducing hot/boiling water tangentially into the brewing chamber for enhanced brewing.

In accordance with an additional embodiment of the system of the present invention, hot/boiling water may be introduced tangentially or laterally into the inlet funnel enabling the other ingredients required for the purpose of brewing the beverage to swirl in the stream of tangentially introduced hot water and then be introduced into the brewing chamber to enhance the brewing process.

The receiving means stated herein above may be a container. Alternatively, the decoction may be dispensed into a container via a straining or filtering means.

The filtering means although has been exemplified as a strainer for the purpose of the invention, the filtering means is not limited to strainers and may be any other means capable of filtering. Exemplary filtering means other than a strainer may without limitation include a colander, a sieve, a mesh, a sifter, a cloth or a combination thereof.

In another embodiment of the present invention, the strainer is a detachable component. In accordance with an embodiment of the present invention, the strainer is connected to a half milled shaft at one end and a coil is loaded at the other end. In another embodiment of the present invention, the strainer can rotate 180 degrees because of the half milled shaft aids and the spring loaded end enables easy detachment of the strainer from the system. A clasp or pin of the flip that triggers the flip of the strainer rotates by about 30-45 degrees only. The remaining angular displacement of the strainer is achieved by the velocity or momentum of the spin. The velocity/momentum and an immediate halt provide the necessary jerk to dislodge any spent leaves from the strainer.

In another embodiment of the system of the present invention, the decoction is dispensed from the system through multiple channels provided at the outlet of the system. In yet another embodiment of the system of the present invention, the brewing chamber is made from a heat resistant material such as but not limited to stainless steel, food grade anti corrosive coating metals, ceramic material or any combination thereof.

In another embodiment of the system of the present invention, various rinsing mechanisms may be employed in the system to ensure sanitization of the system.

In another embodiment of the system of the present invention, the system may comprise resilient elements such as but not limited to springs, coils which may be disposed on either side of the brewing chamber (typically diagonally) to provide flexibility in smooth functioning and reduce resonance/vibration of the brewing chamber with respect to a bracket holding the brewer chamber.

In another embodiment of the present invention, the actuator may co-operate with a 2-armed lever arrangement.

In another embodiment of the present invention, condiments such as sugar or other sweetener, cream, cardamom, ginger, lemon or lemon flavoring and the like may also be added to the brewing chamber from separate canisters suitably disposed within the system.

In yet another embodiment of the system of the present invention, the input panel is typically activated to generate an initiate signal by at least one mode including currency coins, physical mode i.e. touch, voice recognition, retina recognition and the like.

In yet another embodiment of the system of the present invention, the receiving of an initiate signal from an input panel by a microcontroller may be pre-programmed.

The step of dispensing the decoction may be preceded by straining the decoction to eliminate any residues contained therein.

In accordance with an embodiment, the step of stirring the mixture in the brewing chamber may be an optional step intended for enhancing the brewing process.

The tea brewing system and method described herein above significantly reduces the time for automated tea brewing and dispensing and is thereby very convenient and useful, whereby it may be used to brew a cup of tea in less than 20 seconds. Brewing time is subject to the particulate size and quality of tea such as but not limited to dust, leaves, crush, tear and curl method and the like.

The quantity per cup may be set between 50 ml to 200 ml. The brewing system described herein above finds application in both domestic and commercial use and accordingly, a larger quantity of beverage may be produced and dispensed by making necessary volumetric changes in the design of the exemplary embodiment of the system described herein above.

The brewing system can also be used to brew coffee. Coffee beans could be ground in a separate mill or ground coffee could be directly used. This would however necessitate a second level of fine filtering using filter paper after it is filtered through the strainer. The filter paper could be provided on a two roller motor driven mechanism and about 80 mm long sheets of filter paper may be pulled out each time a cycle of brewing gets completed.

In an embodiment of the invention, where not expressly disclosed the components of the present systems is made of a material selected from group of a metal, a metal alloy, a polymer, a rubber, a glass, minerals, gem stones, a fiber, a ceramic, or any combination thereof.

In an embodiment of the invention, the at least one filtering component may be of any suitable material and may be replaced as necessary depending upon the type of residue, number of usages, and the likes.

In an embodiment of the invention, the at least one filtering component may be equipped with a sensory component that allows the system to sense the presence of residue in the at least one filtering component thus allowing the at least one actuator which is operationally coupled to the at least one pivoting component induce repetitive and fast rotational motion and create a jerking or jolting effect for discarding or removal of residue from the at least one filter.

In an embodiment of the invention, plurality of the at least one filtering component may be present for multilevel filtering process.

In an embodiment of the invention, plurality of the at least one filtering component may be coupled to one or more of the at least one pivoting component and further may be capable of being flipped or overturned by one or more of the at least one actuator operationally coupled to the at least one pivoting component.

In an embodiment of the invention, the at least one actuator may be selected from but not limited to electrical actuator, mechanical actuator, pneumatic actuator, magnetic actuator, or the likes.

In an embodiment of the invention, the at least one filtering component may be selected from but not limited to Stainless Steel, Polyester, Polypropylene, Homopolymer Acrylic, Antistatic, Millipore, acid resistant, chemical resistant, Teflon, or the likes.

In an embodiment of the invention, the system may be further associated with one or more cleaning mechanism to ensure maintenance of hygiene.

In an embodiment of the invention, where not expressly disclosed the components in accordance with the present invention may be of any shape such as but not limited to polygon, circular, cone, oval, rectangular, square, cylindrical, or any combination thereof.

In an embodiment of the invention, where not expressly disclosed the components in accordance with the present invention may be of any length or breadth or height, diameter, radius, circumference, surface area, volume, thickness or any combination thereof. In an embodiment of the invention, the component or the parts of the system may be coated, painted or colored with a suitable chemical to retain or improve its properties, or to improve the aesthetics or appearance.

In an embodiment of the invention, the components of the present invention may be connected or arranged by using any suitable method and may include without limitation use of one or more of welding, adhesives, riveting, fastening devices such as but not limited to screw, nut, bolt, hook, clamp, clip, buckle, nail, pin, ring.

In an embodiment of the invention, one or more of a process or step carried out by the system may involve use of an electronic device or a data processing device or a sensor or a microcontrollers or a PLC (Programmable logic controller) or a PID (proportional-integral-derivative) controller, or a combination thereof, which may further involve one or more predefined algorithms or programs or logic.

The terminology used herein is for the purpose of describing particular embodiments only and is not intended to be limiting of the invention. As used herein, the singular forms "a", "an" and "the" are intended to include the plural forms as well, unless the context clearly indicates otherwise.

It will be further understood that the terms "comprises" or "comprising," when used in this specification, specify the presence of stated features, integers, steps, operations, elements, or components, but do not preclude or rule out the presence or addition of one or more other features, integers, steps, operations, elements, components, or groups thereof.

The use of the expression "at least" or "at least one" suggests the possibility of use of one or more elements, as the use may be in one of the embodiments to achieve one or more of the desired objects or results.

Spatially relative terms, such as "inner," "outer," "beneath", "below", "lower", "above", "upper", top, bottom and the like, may be used herein for ease of description to describe one element or feature's relationship with another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Any numbers disclosed are approximate values, regardless whether the word "about" or "approximate" is used in connection therewith. They may vary by 1 percent, 2 percent, 5 percent, or, sometimes, 10 to 20 percent. Whenever a numerical range with a lower limit, RL and an upper limit, Ru, is disclosed, any number falling within the range shall be specifically disclosed. In particular, the following numbers within the range are specifically disclosed: $R=RL+k*(Ru-R)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Particularly, the numerical values mentioned for the various physical parameters, dimensions or quantities are only approximations and it is envisaged that values higher/lower than the numerical values assigned to the parameters, dimensions or quantities fall within the scope of the invention, unless there is a statement in the specification specific to the contrary.

The process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

The aim of this specification is to describe the invention without limiting the invention to any one embodiment or specific collection of features. Person skilled in the relevant art may realize the variations from the specific embodiments that will nonetheless fall within the scope of the invention.

It may be appreciated that various other modifications and changes may be made to the embodiment described without departing from the spirit and scope of the invention.

EXAMPLE OF WORKING OF THE INVENTION

For freshly brewed tea of around 100 ml to be prepared using the system and method of the present invention, following parameters and results were observed:
- maintaining the pre-heated brewing chamber at 75 to 100 degree Celsius,
- 4 grams of tea is introduced with 100 ml of hot water at a temperature of 92 to 97 degree Celsius.
- the brewing time is of 10 seconds and requires 5-7 seconds to dispense the brewed tea to a container via a filter.

I claim:

1. A system for producing and dispensing freshly brewed beverage, the system comprising:
   a) an input panel associated with an electronic controller for performing one or more control operations related to the system and signaling a user input to a triggering component;

b) the triggering component which on receiving said user input through the input panel triggers the feeding of ingredients of the beverage to be freshly brewed in an inlet funnel;
c) an inlet funnel capable of receiving the ingredients of the beverage to be freshly brewed based on user preferences selected on the input panel;
d) a brewing chamber constituting an upper chamber and a lower chamber, the upper chamber capable of receiving the mixture from the inlet funnel;
e) an agitator disposed within the brewing chamber to enable agitation of the mixture for brewing the beverage to prepare the brewed beverage;
f) an agitator motor to activate and drive the agitator;
g) a connecting shaft coupled with an actuator and connected to a hatch;
h) the hatch which on disengaging or setting free allows creation of an opening at the lower chamber of the brewing chamber facilitating the outflow of the brewed beverage;
i) the actuator actuating the motion of the connecting shaft to set free or disengage the hatch; and
j) an outlet valve through which the brewed beverage is dispensed out;
wherein the brewed beverage is agitated substantially in the brewing chamber and the lower chamber is optionally pre-heated to allow a suitable temperature for the brewing; and
wherein the when the brewing process is completed, the agitator motor is stopped and the hatch is opened at substantially the same time to dispense the brewed beverage, to cause the rotational momentum of the brewed beverage to foster exit from the chamber.

2. The system as claimed in claim 1, wherein the hatch is a conical hatch.

3. The system as claimed in claim 1, wherein a bush is coupled to the hatch to adjust the sealing pressure of the hatch.

4. The system as claimed in claim 1, wherein the agitation motor is disposed on an operational top of the brewing chamber.

5. The system as claimed in claim 1, wherein the actuator is an electromagnetic actuator having a coil of a solenoid magnet which gets charged.

6. The system as claimed in claim 1, wherein the actuator is selected from the group of actuators consisting of hydraulic, pneumatic, electric and mechanical actuators.

7. The system as claimed in claim 1, wherein the actuator is coupled to a plunger which is coupled to the hatch, the plunger on actuation causes the shaft to be pulled thereby setting free or disengaging the hatch.

8. The system as claimed in claim 1, wherein the outlet valve includes a flow directing component.

9. The system as claimed in claim 1, further comprising resilient elements disposed on either side of the brewing chamber to provide flexibility and reduce resonance/vibration of the brewing chamber.

10. The system as claimed in claim 1, wherein the upper chamber is made up of food grade plastic and the lower chamber is made up of Teflon coated aluminum.

11. The system as claimed in claim 1, wherein the agitator is disposed off-center within the brewing chamber.

12. The system as claimed in claim 1, further comprising a filtering system associated with a flip mechanism, the flip mechanism comprising:
a) at least one filtering component arranged to filter the brewed beverage dispensed out of the outlet valve;
b) at least one supporting component for supporting the filtering component;
c) at least one pivoting component coupled to the at least one supporting component;
d) at least one flip actuator to actuate at least a portion of an angular displacement of the at least one supporting component;
wherein the at least one supporting component is capable of flipping or overturning on induction of rotational motion of the at least one pivoting component by the at least one flip actuator operationally coupled to the at least one pivoting component; and
wherein on induction, the at least one filtering component is flipped or overturned thereby allowing residue collected in the filtering component after filtering the brewed beverage dispensed out of the outlet valve to be discarded or removed.

13. The system as claimed in claim 12, wherein the filtering component is detachable.

14. The system as claimed in claim 12, wherein the flip actuator is selected from the group of actuators consisting of hydraulic, pneumatic, electric and mechanical actuators.

15. The system as claimed in claim 12, the system further comprises a flip clasp coupled to the at least one pivoting component.

16. The system as claimed in claim 12, wherein the flip actuator is adapted to provide angular displacement of the supporting component to the extent of 30-45 degrees using active energy, a remaining angular displacement of the supporting component being achieved by velocity or momentum of the flip or overturn motion of the supporting component.

17. The system as claimed in claim 12, wherein the at least one pivoting component is provided with a partially milled shaft and is spring loaded on at least one end to facilitate the flip or overturn motion of the supporting component.

18. The system as claimed in claim 12, the flip actuator is an electromagnetic actuator having a plunger co-operating with a 2-armed lever arrangement such that as soon as a coil of an electromagnetic actuator is energized, engagement of a first arm of the lever arrangement causes angular displacement of a second arm that in turn causes the flip clasp to trigger the flip motion of the filtering mechanism, whereas when the coil of the electromagnetic actuator is de-energized, the filtering component flips back into its resting position.

19. A method for producing and dispensing freshly brewed beverage, the method comprising the comprising the steps of:
a) signaling a user input to a triggering component by an input panel associated with an electronic controller for performing various one or more control operations related to the system;
b) triggering of the feeding of ingredients of the beverage to be freshly brewed in an inlet funnel based on user preferences selected on the input panel;
c) introducing the mixture from inlet funnel to a brewing chamber constituted of an upper chamber and a lower chamber;
d) activating and driving an agitator, the agitator disposed within the brewing chamber to enable agitation of the mixture for brewing the beverage to prepare the brewed beverage;
e) actuating the motion of a connecting shaft by an actuator to set free or disengage a hatch which on disengaging or setting free allows creation of an opening at the lower chamber of the brewing chamber facilitating the outflow of the decoction or brewed beverage; and f) dispensing or the brewed beverage through an outlet valve;

wherein the brewed beverage is agitated substantially in the lower chamber of the brewing chamber and the lower chamber is optionally pre-heated to allow a suitable temperature for the brewing;

wherein when the brewing process is completed, the agitator motor is stopped and the hatch is opened at substantially the same time to dispense the brewed beverage, to cause the rotational momentum of the brewed beverage to promote exit from the chamber.

20. The method as claimed in claim 19, wherein the hot water is introduced tangentially into the input funnel.

21. The method as claimed in claim 19, wherein brewing chamber temperature is maintained at 85 to 95 degree Celsius whereas the brewing is carried out for 15 to 20 seconds and dispensing is carried out for 5 to 10 seconds.

22. The method as claimed in claim 19, further comprising the steps of:
   a) filtering the brewed beverage dispensed out of the outlet valve by a filtering component supported by a supporting component; and
   b) actuating a flip mechanism by a flipping actuator causing the flipping of the filtering component pivotally through rotational energy transferred by the actuator to a pivoting component operationally coupled to the actuator, the pivoting component transferring the pivotally rotational energy to the supporting component; and
   c) causing the rotational and pivotal flipping action of the filtering component due to pivotal flipping action of the supporting component.

23. The method as claimed in claim 19, wherein the rotation of the filtering means is carried out using active energy by about 30-45 degrees, while a remaining angular displacement of the filtering component is achieved by velocity/momentum of spin.

* * * * *